United States Patent
Zehler et al.

(10) Patent No.: US 11,237,636 B2
(45) Date of Patent: Feb. 1, 2022

(54) SYSTEM AND METHOD FOR NETWORK CONFIGURATION AND BEHAVIOR CONTROL BY PROXIMITY ENABLED DEVICES

(71) Applicant: Xerox Corporation, Norwalk, CT (US)

(72) Inventors: Peter Zehler, Penfield, NY (US); Gavan Leonard Tredoux, Penfield, NY (US); Premkumar Rajendran, Webster, NY (US); Kanishk Jain, Jersey City, NJ (US)

(73) Assignee: Xerox Corporation, Norwalk, CT (US)

( * ) Notice: Subject to any disclaimer, the term of this patent is extended or adjusted under 35 U.S.C. 154(b) by 874 days.

(21) Appl. No.: 14/513,822

(22) Filed: Oct. 14, 2014

(65) Prior Publication Data

US 2016/0103494 A1 Apr. 14, 2016

(51) Int. Cl.
*G06F 1/16* (2006.01)
*G06F 3/01* (2006.01)
(Continued)

(52) U.S. Cl.
CPC ............ *G06F 3/017* (2013.01); *G06F 1/1694* (2013.01); *G06F 3/1204* (2013.01); *G06F 3/1236* (2013.01); *G06F 3/1292* (2013.01); *G06K 15/007* (2013.01); *H04L 41/0803* (2013.01); *H04N 1/00244* (2013.01);
(Continued)

(58) Field of Classification Search
CPC ...... G06F 3/017; G06F 3/0488; G06F 3/1204; G06F 3/1288; G06F 3/1292; G06K 15/007; G06K 15/1805; G06K 15/1806; H04L 41/0803; H04N 1/00244; H04N 1/00307; H04N 1/00352; H04N 1/00973; H04N 2201/0094; H04W 8/005; H04W 12/06; H04W 48/16; H04W 48/20
See application file for complete search history.

(56) References Cited

U.S. PATENT DOCUMENTS

| 8,271,662 B1 * | 9/2012 | Gossweiler, III | H04M 1/72412 709/227 |
| 2005/0212751 A1 * | 9/2005 | Marvit | G06F 1/1686 345/156 |

(Continued)

*Primary Examiner* — Justin R. Blaufeld
(74) *Attorney, Agent, or Firm* — Fox Rothschild LLP

(57) ABSTRACT

A method and system of configuring a network using a network application of a mobile device including detecting a gesture sequence that comprises at least one gesture, in response to a user performed action. The detected gesture sequence may be indicative of network configuration rules associated with at least one network device. The method may further include receiving and storing network access credentials, and accessing a network configuration database. The network configuration database may comprise a plurality of gesture sequences and a plurality of associated tasks. The method may also include determining a match for the detected gesture sequence among the plurality of gesture sequences; determining an associated task based on the match; and performing the associated task to achieve the network configuration action. The associated task may include a network configuration action based on the network configuration rules associated with at least one network device.

20 Claims, 3 Drawing Sheets

(51) Int. Cl.
*G06F 3/12* (2006.01)
*H04L 12/24* (2006.01)
*H04N 1/00* (2006.01)
*H04W 12/065* (2021.01)
*H04W 48/16* (2009.01)
*H04W 48/20* (2009.01)
*G06K 15/00* (2006.01)
*G06K 15/02* (2006.01)
*H04W 12/68* (2021.01)

(52) U.S. Cl.
CPC ..... *H04N 1/00307* (2013.01); *H04N 1/00352* (2013.01); *H04N 1/00381* (2013.01); *H04N 1/00973* (2013.01); *H04W 12/065* (2021.01); *H04W 48/16* (2013.01); *G06K 15/1805* (2013.01); *G06K 15/1806* (2013.01); *H04N 2201/0094* (2013.01); *H04W 12/68* (2021.01); *H04W 48/20* (2013.01)

(56) References Cited

U.S. PATENT DOCUMENTS

| | | | |
|---|---|---|---|
| 2008/0152263 A1* | 6/2008 | Harrison | G06F 1/1694 382/313 |
| 2008/0309632 A1* | 12/2008 | Westerman | G06F 3/04817 345/173 |
| 2009/0017799 A1 | 1/2009 | Thorn | |
| 2011/0083111 A1* | 4/2011 | Forutanpour | G06F 1/1694 715/863 |
| 2011/0187505 A1* | 8/2011 | Faith | G06Q 20/389 340/10.1 |
| 2013/0069985 A1* | 3/2013 | Wong | G06F 1/163 345/633 |
| 2013/0079037 A1 | 3/2013 | Dobyns | |
| 2013/0090064 A1* | 4/2013 | Herron | G06Q 30/0267 455/41.2 |
| 2013/0122814 A1 | 5/2013 | Shen et al. | |
| 2013/0165098 A1 | 6/2013 | Nakazawa et al. | |
| 2013/0223279 A1* | 8/2013 | Tinnakornsrisuphap | H04W 4/80 370/254 |
| 2013/0262719 A1 | 10/2013 | Suggs | |
| 2014/0045463 A1 | 2/2014 | Hsieh et al. | |
| 2014/0258943 A1* | 9/2014 | Gossweiler, III | G06F 3/017 715/863 |
| 2014/0282282 A1* | 9/2014 | Holz | G06F 13/105 715/863 |

* cited by examiner

SYSTEM AND METHOD FOR NETWORK CONFIGURATION AND BEHAVIOR CONTROL BY PROXIMITY ENABLED DEVICES

BACKGROUND

In recent years, wireless communication methods such as wireless local area network (LAN) and Bluetooth have been increasingly used as means for communication between electronic devices such as cellular phone terminals, gaming devices, and television receivers and as means for communication between such a device and an access point. However, wireless communication involves the risk that the content of a communication may be intercepted and the risk that an outsider may invade the network.

In order to avoid such risks, an "authentication" process is normally performed for a terminal that connects to a wireless network. In order to further enhance the security of the wireless LAN, the authentication operation itself is occasionally encrypted. Since wireless networks utilize radio waves for communication, network devices must be configured according to various wireless settings in order to communicate with a wireless access point. Hence, in order to make initial settings for starting communication, a user is required to perform operations such as checking an SSID (Service Set IDentifier) of a device to input the SSID, or selecting an SSID from a list, a password or key associated with wireless encryption settings required for secure communications with a wireless client computing device, and so forth.

Typically, the required configuration settings are manually entered utilizing software on each client computing device desired to be connected to a wireless network. Manual wireless configuration methods however, suffer from a number of drawbacks. One drawback is that configuration settings must be entered each time a new device is added to a wireless network which requires a user to have an understanding of and access to the required settings. Further, technical knowledge is required to perform such operations, and therefore it is difficult for a user without such knowledge to even make settings.

The user may also be required to remember login credentials, such as passwords and PIN codes making it cumbersome. Restricting network access to certain devices at all or certain times further adds complexity to the network configuration process.

The current disclosure discloses systems and methods to achieve desired network configuration settings and connections without much user intervention, by using proximity enabled device features that are widely deployed and available.

SUMMARY

In an embodiment, the method (and system) of configuring a network using a mobile device includes detecting a gesture sequence that comprises at least one gesture, in response to a user performed action, via a network application of the mobile device. The detected gesture sequence may be indicative of network configuration rules associated with at least one network device. The method may further include, via the network application, receiving and storing network access credentials, and accessing a network configuration database. The network configuration database may comprise a plurality of gesture sequences and a plurality of associated tasks. The method may also include, via the network application, determining a match for the detected gesture sequence among the plurality of gesture sequences; determining an associated task based on the match; and performing the associated task to achieve the network configuration action. The associated task may include a network configuration action based on the network configuration rules associated with at least one network device.

Optionally, the method also may include installing the network application on the mobile device.

The method may further include prompting a user to define and input one or more gesture sequences and associated tasks, and updating the network configuration database to include the received gesture sequences and associated tasks.

In various embodiments, detecting a gesture sequence includes detecting the at least one gesture using one or more sensors of the mobile device, wherein the at least one gesture is indicative of a motion of the mobile device.

Additionally and/or optionally, the method may also include connecting the mobile device to the network via a wireless access point. Connecting the mobile device to the network via the wireless access point may include detecting a primary gesture sequence, and the primary gesture sequence may indicate to the network application to perform, for example, configuring the mobile device; configuring the wireless access point; and connecting the mobile device to the network.

In certain embodiments, performing the associated task comprises performing one or more of the following actions: identifying the at least one network device; identifying characteristics of the at least one network device; authorizing network access and defining a level of access; and configuring the at least one network device and a wireless access point to facilitate network configuration.

In certain other embodiments, detecting the gesture sequence may include detecting a motion of the mobile device based on one or more of user performed actions. Examples of user actions may include a tap, a shake, a change in orientation, and a relative motion.

The method may also include outputting, via a user interface, an indication of the status of the associated task. In certain other embodiments, the method may include storing the first network configuration and automatically applying the first network configuration in response to detecting a gesture sequence.

In an alternate embodiment, detecting the gesture sequence comprises detecting one or more of: proximity of the mobile device to another device; a predetermined time; power on status of the mobile device; and completion of a predetermined activity on the at least one network device.

In some embodiments, the detected gesture sequence may include detecting proximity between the mobile device and a network device followed by detecting proximity between the mobile device and a wireless access point. Additionally, performing the associated task to achieve the network configuration action may include pairing the network device to the wireless access point.

DETAILED DESCRIPTION

Figure 1:
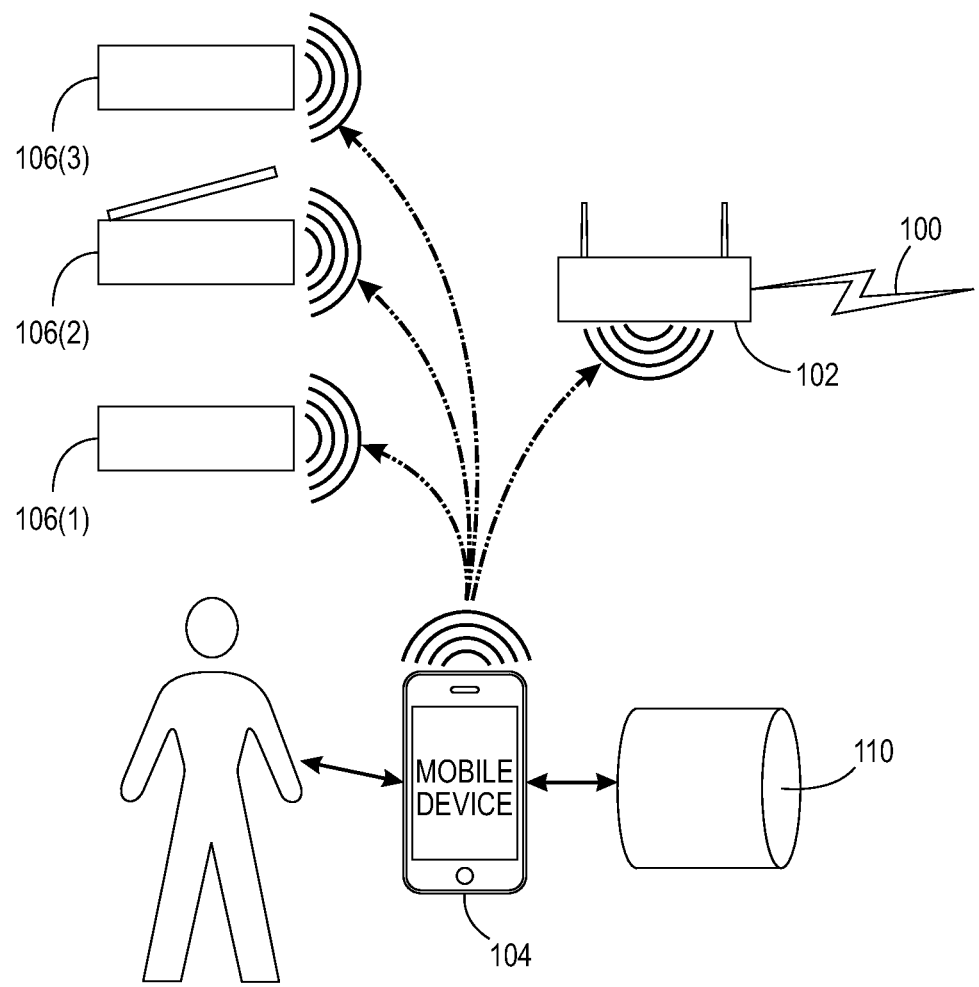
FIG. 1 is a schematic illustration of a system for achieving network configuration and behavior control functionality, by proximity enabled devices, according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

A "mobile device" refers to a portable computing device that includes an acceleration sensor, a processor, one or more wireless communication subsystems, and non-transitory, computer-readable memory. The memory may contain programming instructions in the form of a software application that, when executed by the processor, causes the device to perform one or more network configuration and control operations according to the programming instructions. Examples of suitable devices include portable electronic devices such as smartphones, personal digital assistants, tablet devices, electronic readers, personal computers, media players, satellite navigation devices and the like.

An acceleration sensor is a device that operates to detect and output a measurement of acceleration, as the time-variation rate (time differential) of the speed. In an embodiment, a 3-axis acceleration sensor capable of detecting acceleration in the directions of three axes, namely x-axis (transverse direction), y-axis (vertical direction), and z-axis (depth direction), for example, is used as the acceleration sensor. In the present disclosure, the acceleration detected along the three axes is used to determine what gesture (motion) is made by a user holding a device.

A "network device' refers to a device that is accessible to a network and is capable of being configured. Examples of network device may include, without limitation, servers, personal computers, smartphones, personal digital assistants, tablet devices, electronic readers, media players, satellite navigation devices, multifunction devices, gaming devices, and smart appliances.

"Configuring a network" refers to providing, to at least one networked device, organization, monitoring, and/or management data relating to a desired network configuration. The term "network configuration" refers to a specific set of network devices that form a communications network at any given point in time, the operating characteristics of these networked devices, and/or the physical and logical connections that have been defined between them. Examples of configuring a network may involve identifying one or more network devices, and device characteristics, features, and/or functions; setting, for each network device, various switches and jumpers for hardware and defining values of parameters for software; creating network connections and determining how the network devices share information with each other over the network connections; identifying (authenticating) the person or some characteristic of the person using the devices; authorizing the network access and/or to what extent the device(s) may access the network; and configuring one or more devices with settings and information to facilitate paired operation.

The term "gesture" as used herein means a detected motion of a mobile device, wherein the motion results from an action consciously made by the user. The term "gesture sequence" as used herein means a series of gestures with or without breaks within a time period. Examples of gestures and gesture sequences will be described below.

The term "coupling" as used herein means establishing a paired communication link whereby the devices recognize each other and transmit messages via a communications protocol. Use of the terms "coupled" and "connected", along with their derivatives, may be interchangeably used. For example, "coupled" may be used to indicate that two or more elements are in either direct or indirect (possibly with other intervening elements between them) physical or electrical contact with each other, and/or that the two or more elements co-operate or interact with each other.

FIG. 1 shows an example network 100 which may include at least one wireless access point (WAP) 102, a master mobile device 104, and a plurality of network devices 106(n). In an embodiment, the network devices may include a computer 106(1), a multifunction device 106(2), a television 106(3), and other such devices. In an embodiment, a multifunction device may be a print device that also performs other functions, such as scanning or faxing. Additionally, the network 100 may also include a local database and/or a remote server 110. The WAP 102 may provide wireless access for the configured network devices 106(n) to connect to the network 100. In an embodiment, the WAP 102 may be a WiFi wireless router or a gateway. It should be appreciated that the network may comprise any type of computing network such as a Wireless Local Area Network (WLAN), Local Area Network (LAN), Wide Area Network (WAN), Ethernet or the Internet, or a combination of such networks.

According to various embodiments, among others, utilizing the technical features described herein, the access point 102 may be configured with a number of network connectivity settings, including but not limited to settings which are known to those skilled in the art, for enabling similarly configured network devices to connect to a network. These network connectivity settings may include, but are not limited to, a service set identifier (SSID), wireless network security settings, a dynamic host configuration protocol (DHCP) setting, a static Internet Protocol (IP) address, a domain name server address (DNS) setting, and a media access control (MAC) address.

Configuring and controlling network access for the network devices 106(n) may involve, without limitation, access to information and processing capability external to the network devices. The information needed may be passed using a variety of medium. For example, some or all of the information needed to effect configuration may be communicated through a contact point between two devices using a short range communications protocol (discussed below). Additionally and/or alternatively, some or all of the information may be communicated using a wireless capability of either or both devices.

The mobile device, network devices, and the WAP may include a short-range communication device embodied as a circuit or similar electronic component that allows for contactless communication between devices that are located very close to one another. A short-range communication device may provide short-range communication functionality and enable connection to short-range wireless network communications. The short-range communication device may be capable of communicating using a short-range wireless communication technology, such as near field communication (NFC) or radio frequency identification (RFID) protocols. Short-range wireless network communications, in some examples, may include wireless communications of approximately 10 meters or less.

Near field communications are defined by a collection of standards for radio frequency communications that may be used when two devices are in close proximity. Protocols for implementation of near field communication may comply with industry standards, such as ISO/IEC 18092 or ISO/IEC 18000-3, published by the International Standards Organization. Typical ranges for near field communications are approximately 10 cm or less. Near field communications can support two-way (or peer-to-peer) communications between devices. In a passive mode, an NFC initiator device may output a carrier field that a target device (or transponder) uses to respond by modulating the provided field. In an active mode, the initiator and the target can each generate a carrier field, and the devices communicate by altering the fields. When utilizing two-way communications, two devices may exchange data to perform various functionalities that are enabled as a result of the near field communications.

An NFC tag may be simply affixed to or included in a device as a static tag or the tag may be integrated into the communications interface of the device as a dynamic tag that is powered by the device. The NFC tag may include information to be transmitted to other NFC enabled devices.

Near field communications require close proximity (e.g., no more than a few inches) to establish a communications link, and hence the operation of establishing a link with another NFC-enabled device may be referred to as a "tap." The term "tap" as used herein does not necessarily refer to physical contact between communicating NFC-enabled devices, but rather positioning the NFC-enabled devices in sufficiently close proximity to establish an NFC communications link. Therefore, a user of an NFC-enabled smart phone may tap an NFC tag of another NFC-enabled device to send and/or receive data from the tag to and/or from the other device. Near field communication offers several advantages over other wireless protocols and methods for encoding data to be read by a mobile terminal because of the short range nature of near field communications. Some examples include avoiding cross-talk from other nearby tags, managing access, improving security, and low power requirements. NFC tags may also be configured such that when read by the mobile terminal, the tags include information or instructions that cause the mobile terminal to perform certain processing tasks, such as launching of applications, navigating to a particular website, or downloading of a particular file.

The mobile device, network devices, and the WAP may also comprise communication functionality having a greater bandwidth and/or longer range than short-range communication device. Examples may include Wi-Fi, second-generation wireless telephone technology (2G), third-generation mobile telecommunications (3G), fourth-generation wireless telephone technology (4G), or Long Term Evolution (LTE) functionality, or other network functionalities.

In an embodiment, network configuration and control may involve tasks such as identifying one or more network devices, and device characteristics, features, and/or functions; identifying (authenticating) the person or some characteristic of the person using the devices; authorizing the network access and/or to what extent the device(s) may access the network; and configuring one or more devices with settings and information to facilitate paired operation.

Figure 2:
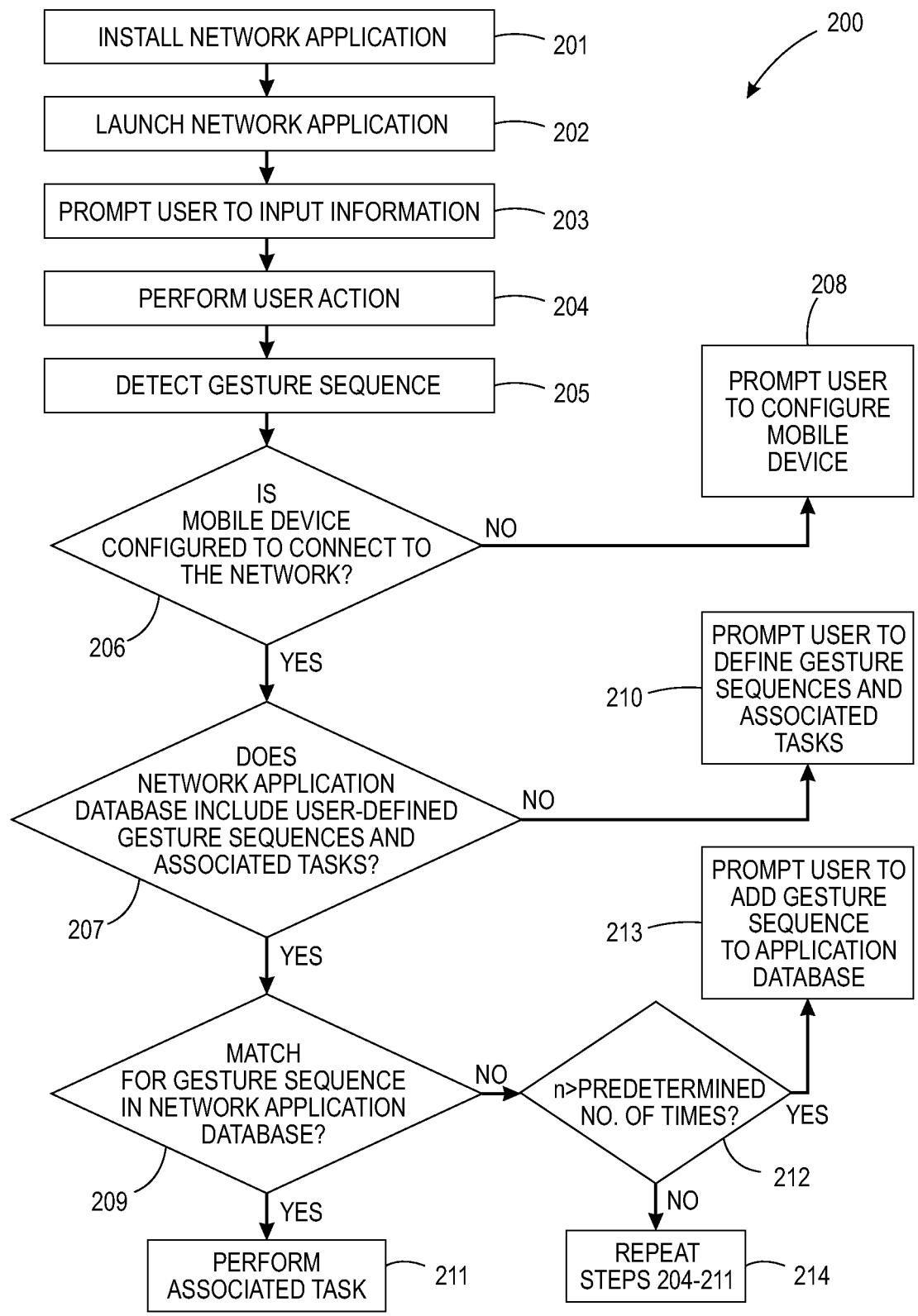
FIG. 2 depicts a flow chart example of a process for configuring and controlling a network, according to an embodiment.

FIG. 2A depicts a flow chart example of a process for configuring a wireless network using a WAP and a master mobile device. To begin with, the user of a mobile device may download and install a network application on to the mobile device in step 201. The user may acquire the network application by downloading it from a distribution platform (e.g., the Apple App Store, Google Play, the Amazon Appstore, the Windows Phone Marketplace and/or BlackBerry App World), or from a network service provider. In certain embodiments, the network application may be pre-installed on the mobile device. The network application may include virtually any application type which may run on any underlying operating system or platform. In one embodiment, the network application may cause the mobile device to provide a graphical touchscreen-based user interface for configuring a network. Various screens may be included in the network application. Using the network application, different types of networks and different types of WAPs may be configured using the master mobile device.

The network application may correspond to a local application which executes on the mobile device. Alternatively, the network application may represent a web application which executes on a remote application server. That is, the network application may include any application functionality which is accessed by the user over a network and experienced locally as application e.g., using a browser running on the mobile device. The network application may include a database of information. In certain embodiments, the database may be exported to another local device or to a cloud repository. Techniques for executing such a network application, and related technology, are well known in the art and are therefore not described further in detail herein, except as may be helpful or necessary to understand operations of the system.

Further, the network application may be capable of detecting default settings of one or more detected WAPs. These default settings of the network security device may be displayed to a user for authentication. According to one embodiment, the network application may retrieve the Internet Protocol (IP) address, the default gateway and one or more Domain Name Server (DNS) addresses through Dynamic Host Configuration Protocol (DHCP) from a DHCP server associated with the communications network. These retrieved values may be set as default values and presented to the user to be revised or accepted as appropriate. The retrieved information may be stored in the network application database.

There may be one or more scenarios under which the network application will launch 201 on the mobile device. In certain embodiments, the network application may launch automatically when the WAP is recognized as proximate (i.e., when the WAP is within a detection range of the device's network detection elements). In certain embodiments, the network application may launch 202 automatically when a particular defined gesture and/or a gesture sequence is performed by a user (as discussed below). In certain other embodiments, the user may manually launch 202 the network application by activating it on a screen of the device and/or by voice command. In certain embodiments, the user may password protect access to the network application, and the network application may prompt the user to enter username and/or password upon launch before it will proceed to connect to the network or perform certain other functions.

In step 203, upon launch, the network application may prompt the user of the master mobile device to enter or input or select certain authentication information. In some embodiments, the information may include the SSID name and password for connecting to the network and communicating with the WAP. In certain embodiments, the authentication information may be stored in the network application database for future use. This may reduce the number of steps for network configuration and control.

In step 204, the user may perform a particular action that causes the device to detect a gesture and/or a gesture sequence that when received by the device causes the device to take certain actions. The network application in step 205, may recognize the user performed action to detect a gesture and/or a gesture sequence, using the device sensors (e.g., accelerometer) as discussed previously. For example, the user performed action may be moving the device towards a WAP, which may cause the application to detect a gesture sequence including movement of the device (using the accelerometer) and proximity to WAP (using the NFC tag). Those ordinarily skilled in the art will understand that there are many other ways in which the network application may detect the gestures and/or gesture sequences. It will also be understood to those skilled in the art that in certain embodiments, the network application may run in the background upon detection of the gesture and/or gesture sequence in step 205. The application may require the user to enter a known set of authentication information before the application will fully function.

In step 206, in response to detecting a gesture/gesture sequence, the network application may determine if the master mobile device is configured to connect to the network through the WAP. If the network application determines that the master mobile device is not configured to connect to the network, it may prompt 208 the user of the master mobile device to perform the necessary steps to configure the network and the master mobile device. In an example embodiment, the network application may include a default gesture and/or gesture sequence that the user may perform to configure the network and the master mobile device.

An example gesture sequence may include detection of a shaking motion on the master mobile device, performed by the user to indicate the first device (i.e., the master mobile device) followed detection of proximity to the WAP based on a tap performed by the user. The gesture sequence may indicate to the network application that the user wishes to connect to the network. The network application may thus transmit the previously obtained the SSID name and password to the WAP, and automatically configure the master mobile device and/or the WAP to be able to connect to the network. The network application may also give the user an indication of completion of the configuration step. For example, the master mobile device may vibrate, beep, or flash to indicate that is connected to the network. In an embodiment, the user may be allowed to change the default gesture and/or gesture sequence. In an alternate embodiment, initially (i.e., the first time) the user may be prompted to manually connect the master mobile device to the network, and thereafter may be allowed to define a gesture and/or gesture sequence for configuring connecting the master mobile device automatically.

If the application in step 206 determines that the master mobile device is configured to connect to the network, then in step 207, the network application may further determine if the network application database includes user defined gestures and/or gesture sequences and associated tasks (examples discussed below). If in step 207, the network application determines that the network application database does not include user defined gestures and/or gesture sequences and associated tasks, the network application may prompt 210 the user of the master mobile device to input and associate various network application functionalities or tasks with a plurality of gestures and/or with a plurality of gesture sequences, detected by the application in response to actions performed by the user of the master mobile device. User actions may include taps (bringing the NFC enabled master mobile device within a predetermined distance of the NFC tag attached to and/or incorporated within the WAP or the network devices), rotations, waves, shakes, vibrations, and other such actions. The actions may trigger the application to detect gestures and/or gesture sequences using mobile device sensors. Gestures and/or gesture sequences may include detecting motions and type of motions of the mobile device, detecting speed and/or acceleration, detecting distance from other devices, and other such gestures. In certain embodiments, the gesture association information may be stored in the network application database for future use. Example gestures and gesture sequences and associated network application tasks are discussed in detailed below.

Additionally and/or alternatively, the user may be prompted to define at least one gesture and/or gesture sequence, and associate the gesture and/or gesture sequence with a task that the mobile device or its connected device will perform, when the network application is first downloaded. The network application may store the gesture and/or gesture sequence with the associated task in the application database. In this embodiment, the network application need not perform step 207.

If the network application determines that the application database includes the user defined gestures and/or gesture sequences, the network application in step 209 may browse the network application database to find a match for the detected gesture and/or gesture sequence. If the network application finds a match in step 209, it may perform an associated task in step 211.

The associated task may be a task that the network application must perform in response to detecting a gesture and/or gesture sequence. The associated tasks may be defined by the user and saved in the network application database. Associated tasks may include any of a plurality of actions such as identifying one or more network devices and device characteristics, features, and/or functions; identifying (authenticating) the person or some characteristic of the person using the devices; authorizing network access and/or defining to what extent the device is permitted or restricted when accessing the network; determining whether the devices are suitable for use for the purpose required and that they are compatible for pairing to accomplish that purpose; configuring one or more devices with settings and information to facilitate the task; and outputting a status of the task to the user. Examples of detected gesture and/or gesture sequence with the associated tasks may include, without limitation, the following:

The network application may operate to interpret device contact, e.g. a tap performed by a user, to detect a gesture sequence including "close" proximity to another device(s) as an indication to perform an associated task of pairing the two devices. The pairing may involve initiating exchange between two devices of at least some authentication, authorization, compatibility, and/or configuration information needed for tasks such as pairing and network access. In some embodiments, the network application may interpret recognition of a particular type of contact as a confirmation that a particular "task" is to occur.

The network application may also detect, in the above gesture sequence, a manner in which contact between two devices, as performed by the user. By identifying a manner of contact, other information may be provided by the contact beyond the fact of contact. This additional information may be used during network access. For example, the additional information may include a token act to authenticate (identify) and/or authorize a user of the device(s). For example, touching and, at the same time, rotating a device clockwise could indicate that pairing should occur between a device and a wireless router, for access to the network. A counter-clockwise rotation gesture could signal that pairing between a device and WAP should occur, with a connection to internet. The manner of touching may also be used for other purposes. For example, in the previous example of touching and rotating, a particular pattern of movements and/or rotations may be used to authorize certain types of access.

The network application may further detect, in the above gesture sequence, which contact area or areas are being touched. The gesture sequence may also include the orientation of one device with respect to the other at the time of contact. Additionally and/or optionally the gesture sequence may include relative motion and corresponding measurements between devices. For example, detecting at least one of: rotation, angle of approach, or relative lateral motion between the devices. Determining relative motion may further include relative direction and speed determination. The associated task may include providing one or more audible and/or visual and/or tactile indications on the progress of an task. It may also include providing feedback regarding success, failure due to insufficient available information, or to indicate that an task is in process.

The network application may operate to detect, in the above gesture sequence, multiple instances of contact and to interpret the multiple instances of contact as an indication of a certain associated task such as allowing pairing between two devices. The associated task may also include determining the level of network access and/or the extent of paining permitted or restricted between two network devices that may be granted. By level of access it is meant authorization of which functions and how extensively certain functions can be performed while the devices are connected to a network. Authorization of a level of access may be based, at least in part, on the identity or at least one characteristic of the user. Authorization of an extent of pairing may be based, at least in part, on the identity of the devices or device characteristics or state. Other factors may be taken into consideration when authorizing a level of access such as time of day, physical location, or proximity of other device(s). For example, one or more network devices may be blocked from accessing the internet if the master mobile device is not within a predetermined distance and/or if an amount of authorized time lapses (e.g. the user of devices is allowed only a certain amount of time on the internet). Network access may also be discontinued after completion of one or more tasks, such as transferring a file, sending an email, or performing a backup.

In an example embodiment, the user may be able to configure a network device to enable access to the network by user action including—a first single tap from the master mobile device on the network device to be given access followed by a second single tap from the master mobile device on the WAP. The corresponding detected gesture sequence may include proximity between the master mobile device and the network device followed by proximity between the master mobile device and the WAP. The first single tap would indicate to the application to perform configuration of the network device for access to the network. The configuration process may include identification of the network device characteristics, features, and/or functions; authorizing the network access; and configuring the device with settings and information to facilitate wi-fi access. The second single tap would indicate to the application to perform configuration of the WAP settings to allow access to the network device. The second tap may also indicate to the application to transfer the requisite information between the network device and the WAP. In certain embodiments, the gesture sequence may also indicate to the application to generate an indication when the configuration process is complete and/or after each step.

In an alternate embodiment, a single tap on the network device followed by multiple taps on the WAPs may indicate to the application that the application may configure the network device to grant access to the wi-fi network only and not the internet. In an example embodiment, the multiple taps on the WAP may include quadruple taps.

In another embodiment, the user may be able to configure two network devices to be able to access each other over the network by a gesture sequence including—a first single tap from the master mobile device on the first network device followed by a second single tap from the master mobile device on the second network device. The corresponding detected gesture sequence may include proximity between the master mobile device and the first network device followed by proximity between the master mobile device and the second network device. The first single tap would indicate to the application to perform the configuration of the first network device. The configuration may include identification of the network device characteristics, features, and/or functions; authorizing the access (pairing); and configuring the device with settings and information to facilitate the paring process. The second single tap would indicate to the application the second device and to perform the necessary configuration settings on the second device. The second tap may also indicate to the application to transfer the requisite information between the two network devices. In certain embodiments, the gesture sequence may also indicate to the application to generate an indication when the configuration process is complete and/or after each step.

In an alternate embodiment, a single tap on the first network device followed by multiple taps on the second network device may indicate to the application that the application may configure the network devices to prevent access to each other on the network. In an example embodiment, the multiple taps on the WAP may include double taps.

In yet another embodiment, the user may be able to configure a network device to enable limited access to the network, such that the network device may only access the network when the network device is in a predetermined range of the master mobile device. An example user action sequence may include—a first single tap from the master mobile device on the network device to be given access followed by a triple tap from the master mobile device on the WAP, detected as a gesture sequence including proximity between the master mobile device and the network device followed by proximity between the master mobile device and the WAP, and repeated (3 times) contact with the WAP.

It will be understood to those skilled in the art that the above examples are by way of explanation only, and other gesture and/or gesture sequence with associated tasks are within the scope of this disclosure.

In certain embodiments, the gesture and/or gesture sequence may indicate to the network application to retain information about the network access allowed to a network device. The retained information may be applied to resume network access, after it is discontinued and-or interrupted, even in the absence of detecting a gesture and/or gesture sequence upon recognition of an event. Example events may include proximity, pre-defined timing, and power on/off of a device. For example, for devices that have lost proximity, network access may be resumed once the master mobile device is once again in proximity. In some other embodiments, the user may be asked if he/she wants to save the information about the network access configuration.

If the network application does not find a match in step 209, it may prompt the user the user to perform the gesture and/or a gesture sequence again in step 214, if the number of attempts "n" is less than or equal to a predetermined number of attempts allowed. The system may perform steps 204-211 for a predetermined number of times till it finds a match in the network application database.

In the network application cannot find a match for the performed gesture and/or gesture sequence after repeating steps 204-211 for a predetermined number of times, it may return an error message in step 213. In certain embodiments, the network application may alternatively prompt 213 the user to associate the gesture and/or gesture sequence with a new network application task.

In an example embodiment, a user may use the above defined process to configure a network 100 and a plurality of network devices 106(n) to generate a complete network configuration for all the network devices, and save the configuration for subsequent automatic configuration according to the user defined rules.

Figure 3:
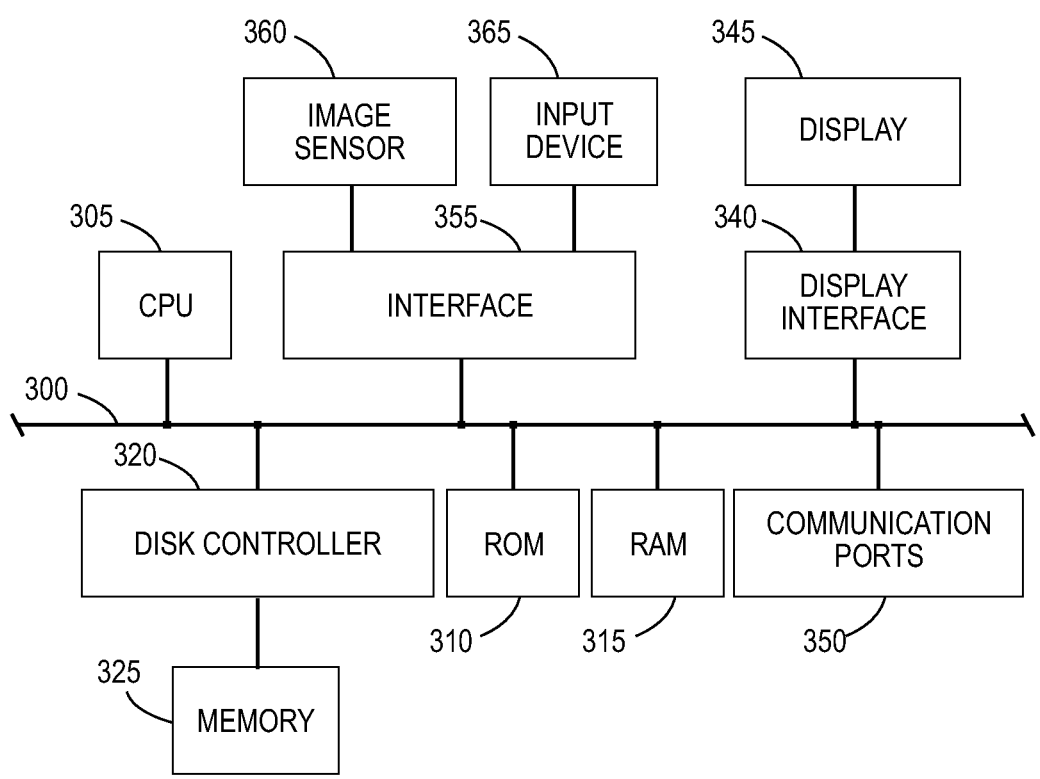
FIG. 3 depicts various embodiments of a mobile device for using the systems and processes described in this document.

The proximity enabled network configuration and control method and process as described above may be performed and implemented by an operator of a mobile electronic device having a processor and a communications interface. FIG. 3 depicts an example of internal hardware that may be used to contain or implement the various computer processes and systems as discussed above. For example, the mobile electronic device discussed above may include hardware such as that illustrated in FIG. 3. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. As used in this document and in the claims, the term "processor" may refer to a single processor or any number of processors in a set of processors. Read only memory (ROM) 310 and random access memory (RAM) 315 constitute examples of memory devices.

A controller 320 interfaces with one or more optional memory devices 325 that service as date storage facilities to the system bus 300. These memory devices 325 may include, for example, an external or internal disk drive, a hard drive, flash memory, a USB drive or another type of device that serves as a data storage facility. As indicated previously, these various drives and controllers are optional devices. Additionally, the memory devices 325 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 310 and/or the RAM 315. Optionally, the program instructions may be stored on a non-transitory, computer readable medium such as a compact disk, a digital disk, flash memory, a memory card, a USB drive, an optical disc storage medium, and/or other recording medium.

An optional display interface 340 may permit information from the bus 300 to be displayed on the display 345 in audio, visual, graphic or alphanumeric format. Communication with external devices may occur using various communication ports 350. A communication port 350 may be attached to a communications network, such as the Internet, a local area network or a cellular telephone data network.

The hardware may also include an interface 355 which allows for receipt of data from input devices such as an imaging sensor 360 of a scanner or other input device 365 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of configuring a network using a mobile device comprising:
   by one or more sensors of a mobile device, detecting a gesture sequence that comprises one or more gestures, wherein each gesture of the gesture sequence consists of a motion of the mobile device in response to at least one user performed action; and
   by a network application of the mobile device: accessing a network configuration database that comprises a plurality of gesture sequences and a plurality of associated tasks;
      recognizing the detected gesture sequence by identifying a match for the detected gesture sequence among the plurality of gesture sequences in the network configuration database;
      using the match to identify an associated task that comprises a network configuration action for configuring at least one network device that is not connected to the network to enable the at least one network device to establish a connection with the network based on network configuration rules associated with the at least one network device; and
      performing the network configuration action to enable the at least one network device to establish the connection with the network by:
         identifying characteristics of the at least one network device,
         authorizing network access and defining a level of access, and
         configuring a wireless access point to facilitate network configuration.

2. The method of claim 1, further comprising installing the network application on the mobile device.

3. The method of claim 1, further comprising, before recognizing the detected gesture sequence:
   determining that a match for the detected gesture sequence has not been identified among the plurality of gesture sequences in the network configuration database;
   prompting a user to define the detected gesture sequence and associate the detected gesture sequence with a task; and
   updating the network configuration database to include the detected gesture sequence and the defined associated task.

4. The method of claim 1, further comprising by the network application before identifying the match for the detected network configuration action:
   determining if the mobile device is connected to the network;
   if the mobile device is not connected to the network, prompting a user to perform a default gesture or gesture sequence; and
   in response to detecting the default gesture or gesture sequence, connecting the mobile device to the network via a wireless access point.

5. The method of claim 1, wherein:
   the one or more sensors comprise an accelerometer; and
   detecting the gesture sequence comprises detecting a motion of the mobile device based on one or more of the following user performed actions:
   a tap;
   a shake;
   a change in orientation; or
   a relative motion.

6. The method of claim 5, wherein detecting the gesture sequence further comprises detecting one or more of the following:
   proximity of the mobile device to another device;
   a predetermined time;
   power on status of the mobile device; and
   completion of a predetermined activity on the at least one network device.

7. The method of claim 1, further comprising outputting, via a user interface, an indication of the status of the associated task.

8. The method of claim 1, further comprising storing a first network configuration corresponding to the network configuration action and automatically applying the first network configuration in response to detecting the gesture sequence.

9. The method of claim 1, wherein the detected gesture sequence includes detecting proximity between the mobile device and a network device followed by detecting proximity between the mobile device and a wireless access point, and wherein performing the network configuration action comprises pairing the network device to the wireless access point.

10. A system for configuring a network using a mobile device comprising:
    a non-transitory, computer readable memory;
    one or more processors; and
    a computer-readable medium containing programming instructions that, when executed by the one or more processors, cause the system to:
    cause one or more sensors of the mobile device to detect a gesture sequence that comprises one or more gestures, wherein each gesture of the gesture sequence consists of a motion of the mobile device in response to at least one user performed action, and
    cause a network application of the mobile device to:
    access a network configuration database that comprises a plurality of gesture sequences and a plurality of associated tasks;
    recognize the detected gesture sequence by identifying a match for the detected gesture sequence among the plurality of gesture sequences in the network access database;
    use the match to identify an associated task that comprises a network configuration action for configuring at least one network device that is not connected to the network to enable the at least one network device to access the network based on network configuration rules associated with the at least one network device, and
    perform the network configuration action to enable the at least one network device to access the network by:
    identifying characteristics of the at least one network device, authorizing network access and defining a level of access, and configuring a wireless access point to facilitate network configuration.

11. The system of claim 10, further comprising programming instructions that when executed by the one or more processors, cause the system to install the network application on the mobile device.

12. The system of claim 10, further comprising programming instructions that when executed by the one or more processors, cause the network application to, before recognizing the detected gesture sequence:
    determine that a match for the detected gesture sequence has not been identified among the plurality of gesture sequences in the network configuration database;
    prompt a user to define the detected gesture sequence and associate the detected gesture sequence with a task; and
    update the network configuration database to include the detected gesture sequence and the defined associated task.

13. The system of claim 10, further comprising programming instructions that when executed by the one or more processors, cause the network application to, before identifying the match for the detected network configuration action:
    determine if the mobile device is connected to the network;
    if the mobile device is not connected to the network, prompt a user to perform a default gesture or gesture sequence; and
    in response to detecting the default gesture or gesture sequence, connect the mobile device to the network via a wireless access point.

14. The system of claim 10, wherein:
    the one or more sensors comprise an accelerometer; and
    detecting the gesture sequence comprises detecting a motion of the mobile device based on one or more of the following user performed actions:
    a tap;
    a shake;
    a change in orientation; or
    a relative motion.

15. The system of claim 14, wherein detecting the gesture sequence further comprises detecting one or more of the following:

proximity of the mobile device to another device;
a predetermined time;
power on status of the mobile device; and
completion of a predetermined activity on the at least one network device.

16. The system of claim 10, further comprising programming instructions that when executed by the one or more processors, cause the system to output, via a user interface, an indication of the status of the associated task.

17. The system of claim 10, further comprising programming instructions that when executed by the one or more processors, cause the network application to store a first network configuration corresponding to the network configuration action and automatically apply the first network configuration in response to detecting the gesture sequence.

18. The system of claim 10, wherein the detected gesture sequence includes detecting proximity between the mobile device and a network device followed by detecting proximity between the mobile device and a wireless access point, and wherein performing the network configuration action comprises pairing the network device to the wireless access point.

19. A method of configuring a print device using a mobile device comprising:
by one or more sensors of a mobile device, detecting a gesture sequence that comprises one or more gestures, wherein each gesture of the gesture sequence consists of a motion of the mobile device in response to at least one user performed action; and
by a network application of the mobile device: accessing a network configuration database that comprises a plurality of gesture sequences and a plurality of associated tasks;
recognizing the detected gesture sequence by identifying a match for the detected gesture sequence among the plurality of gesture sequences in the network configuration database;
using the match to identify an associated task that comprises a print device configuration action for configuring at least one print device that is not connected to the network to enable the at least one print device to access the network based on print device configuration rules associated with the at least one print device; and
performing the print device configuration action to enable the at least one print device to access the network by:
identifying characteristics of the at least one print device;
authorizing network access and defining a level of access; and
configuring a wireless access point to facilitate network configuration.

20. The method of claim 19, further comprising transmitting a print document to the print device, from the mobile device, wherein transmitting the print document to the print device comprises detecting a primary gesture sequence, wherein the primary gesture sequence indicates to the network application to perform at least one of the following:
configuring the mobile device;
connecting the mobile device to the print device; or
transmitting the print document to the print device, from the mobile device.

* * * * *